(12) United States Patent
Courtwright

(10) Patent No.: US 12,021,844 B2
(45) Date of Patent: Jun. 25, 2024

(54) METHOD AND SYSTEM FOR PRIVACY PROTECTION AND USER INTERACTION

(71) Applicant: Brendan Lee Courtwright, Nyack, NY (US)

(72) Inventor: Brendan Lee Courtwright, Nyack, NY (US)

( * ) Notice: Subject to any disclaimer, the term of this patent is extended or adjusted under 35 U.S.C. 154(b) by 242 days.

(21) Appl. No.: 17/727,801

(22) Filed: Apr. 24, 2022

(65) Prior Publication Data

US 2023/0344803 A1    Oct. 26, 2023

(51) Int. Cl.
*H04L 9/40*    (2022.01)
(52) U.S. Cl.
CPC ................. *H04L 63/0421* (2013.01)
(58) Field of Classification Search
CPC .................................................. H04L 63/0421
USPC .......................................................... 726/26
See application file for complete search history.

(56) References Cited

U.S. PATENT DOCUMENTS

| 10,893,329 | B1* | 1/2021 | Trim | G06V 20/46 |
| 11,665,316 | B2* | 5/2023 | Decrop | G06T 5/70 |
| | | | | 348/14.08 |
| 2009/0254430 | A1* | 10/2009 | Cherenson | G06Q 30/02 |
| | | | | 705/14.66 |
| 2015/0325029 | A1* | 11/2015 | Li | G06T 1/0007 |
| | | | | 382/103 |
| 2019/0147185 | A1* | 5/2019 | Cai | G06V 40/173 |
| | | | | 726/30 |

* cited by examiner

*Primary Examiner* — Michael S McNally
(74) *Attorney, Agent, or Firm* — Andrew Morabito

(57) ABSTRACT

The present invention is a computer-implemented method comprising: identifying, by one or more processors, an image of a user; generating, by the one or more processors, an altered image of the user; receiving, by the one or more processors, confirmation that the user has joined a game, and identifying the relationship between the user and the other participants in the game; altering, by the one or more processors, the other participants user interface where the user is shown with the altered image based on a known relationship with the user; and concealing, by the one or more processors, the user's identity from the participants which do not have a relationship with the user.

12 Claims, 14 Drawing Sheets

METHOD AND SYSTEM FOR PRIVACY PROTECTION AND USER INTERACTION

BACKGROUND

This disclosure relates generally connection users to interact with one another, and particularly to a method, computer program and computer system for connecting users through a roulette type function to allows the users to interact with one another.

With the advent of wired and wireless communication networks (i.e., Internet), online computer gaming has become increasing popular with many people. Online services may allow for video game players to play against other players from all over the world. Online gaming has attempted to bring the gaming experience into the home, and many different websites and downloadable applications are available to play many varieties of games, including but not limited to blackjack, poker, baccarat, roulette, craps, dice, etc.

Games are popular, and recently many varieties of new games have been introduced, especially those that can be played over a network such as the Internet. These games allow, in some jurisdictions, players to make bets and win prizes. The Internet has gained a great deal of popularity on certain "betting" card games, such as blackjack. The rules of these types of games are similar to those having similar odds of winning as games.

However, online gaming presents risks for remote players and also presents various types of consumer protection regulatory issues. Most online gaming is not as enjoyable to play as conventional games because the players do not understand how the outcome is being determined. For example, in a virtual card game, there is no way of determining how the cards are being provided to the player. In most online gaming applications, results are determined by a random number generator, which is not understood or appreciated by a player. In the alternative, many of the games purposefully use "seeded decks" in which the number of winning hands is artificially increased or decreased. While the increase in the number of winning hands adds further interest to the game, it results in the reinforcement of a sentiment that the games may be manipulated against a player's interests. Further, because many of the games are played over the internet from non-US providers, the player may not have a manner to redress to unfair or illegal games of chance.

People are however generally more interested in playing against one another than against "a machine", probably due to the machines inherent lack of human intelligence, emotions and other such human factors influencing the outcome of a game Poker and most online games for money between people require a certain degree of skill and game knowledge for a player to be able to play effectively, i.e. the outcome of a game mostly depends on the skill of the player A person not wanting to risk his/her money when lacking such game skills, and not being interested in acquiring such skills through practice, but still wanting to participate and experience the thrill of a network game for money against other people, is currently falling short of opportunities.

Therefore, it is desirable to provide a new system and method that overcome the above issues. The new system and method should, preferably, be open to the massive public audiences with a variety of games that provide equal chances to win and interact with other individuals while playing, while also remaining anonymous.

SUMMARY

The present invention in a first embodiment, is a computer-implemented method comprising: identifying, by one or more processors, an image of a user; generating, by the one or more processors, an altered image of the user; receiving, by the one or more processors, confirmation that the user has joined a game, and identifying the relationship between the user and the other participants in the game; altering, by the one or more processors, the other participants user interface where the user is shown with the altered image based on a known relationship with the user; and concealing, by the one or more processors, the user's identity from the participants which do not have a relationship with the user.

In a second embodiment, the present invention is a computer program product comprising: a computer non-transitory readable storage medium having program instructions embodied therewith, the program instructions executable by a computing device to cause the computing device to: accessing a camera on a user's device to capture an image of the user, wherein the captured image of a user is used to identify a set of facial characteristics of the user; manipulating the set of facial characteristics of the user to hid their identity by modifying the facial characteristics of the user; receiving confirmation that the user has joined a game wherein at least one of the other participants are not known to the user; and providing the manipulated visual representation of the user to the other participants who are not known to the user, wherein the other participants who are not known to the user are able to see facial expressions performed by the user which are shown through the manipulated visual representation of the user.

In a third embodiment, the present invention is a system comprising: a CPU, a computer readable memory and a computer non-transitory readable storage medium associated with a computing device; connecting to an image capturing feature of a user's computing device wherein an image of the user's face is collected; manipulating the user's face so that the user's face is unrecognized in the manipulated version; receiving conformation that the user has connected to a game and analyzing the other participants in the game to determine if the other participants are known to the user; manipulating a feed of the user to the other unknown participants, wherein the feed is manipulated to show the manipulated version of the user's face; and providing real time updates to the feed based on the changes in the user's mannerisms.

BRIEF DESCRIPTION OF THE DRAWINGS

Referring now to the drawings in which like reference numbers represent corresponding parts throughout.

DETAILED DESCRIPTION

Figure 1:
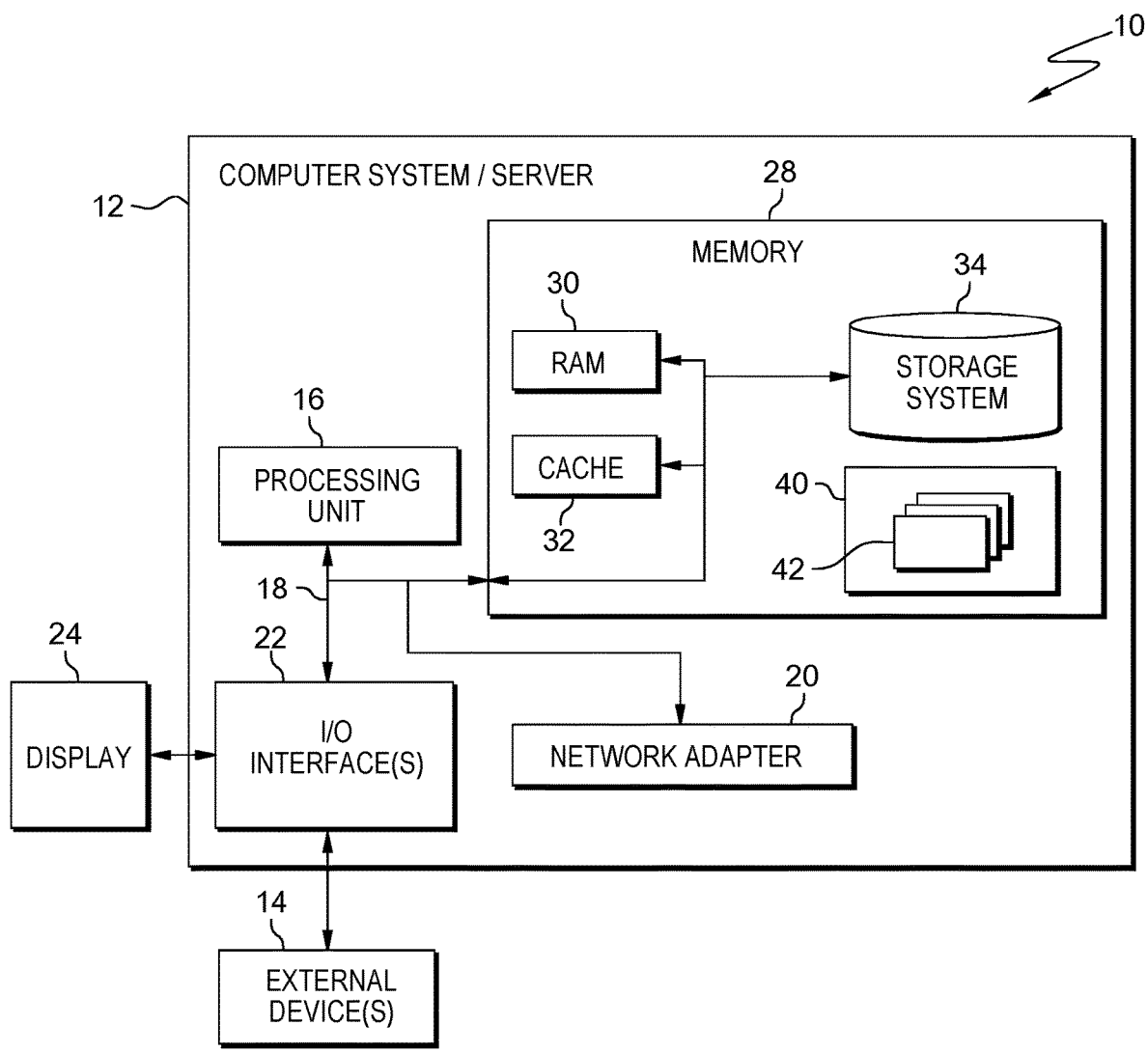
FIG. 1 depicts a cloud computing node according to an embodiment of the present invention.

The present invention generally relates to a system to allow players from around the world to play various games with one another for either fun or for cash prices based on the other player's decision. During the playing of the game, the players are able to interact with one another through chat, messaging, and all the players will be on video while playing with one another. The players are connected through a roulette system so that there is no separation from the players by skill, given that games do not require skill like games but are games which all players have equal footing and require communication between the players. The players will be on video so they can see one another as this is a key aspect of many of the games, and the user's real identity is hidden by either a blurred screen, voice alteration, or a deepfake of the user's face.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user profiles). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
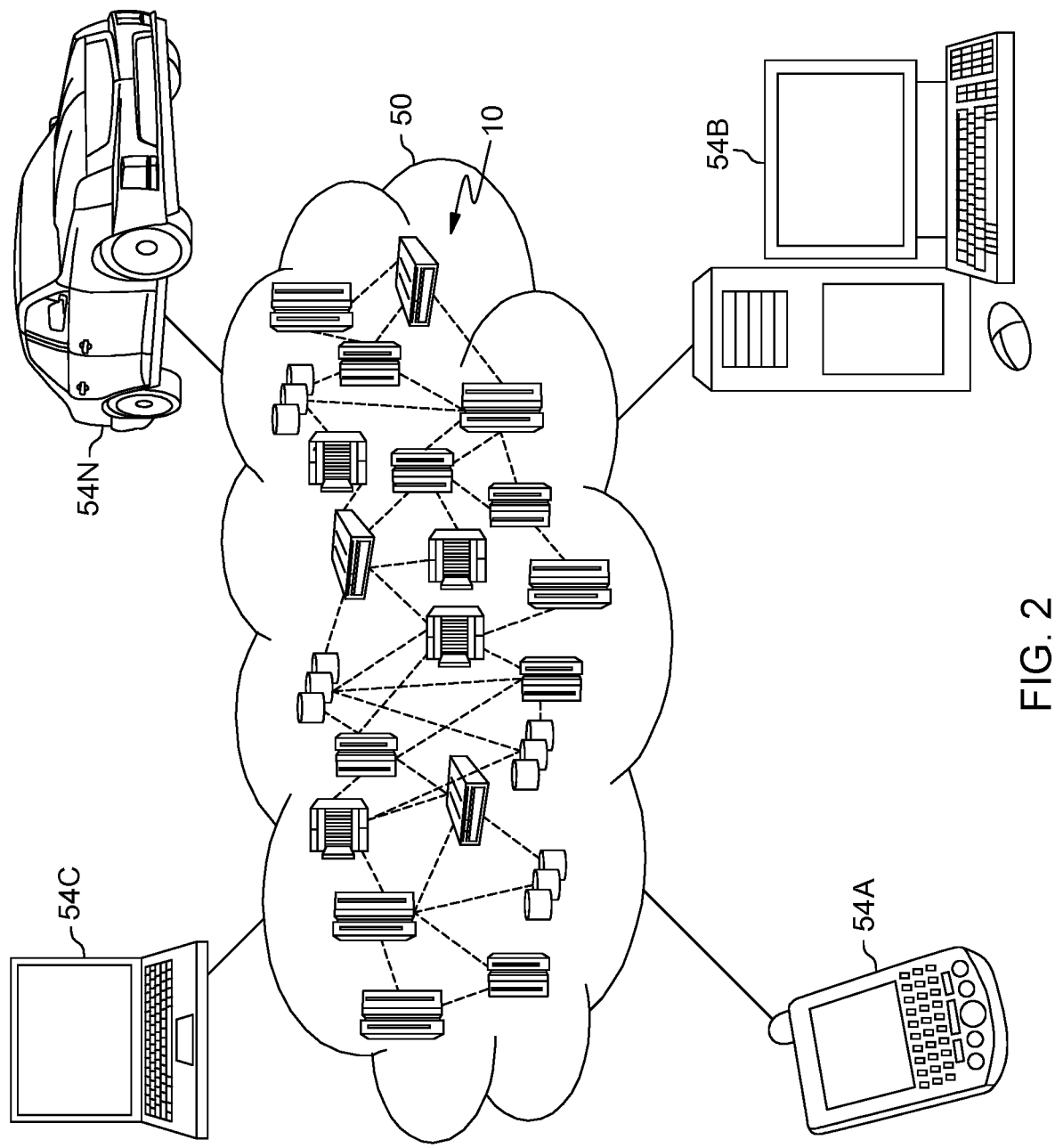
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Figure 3:
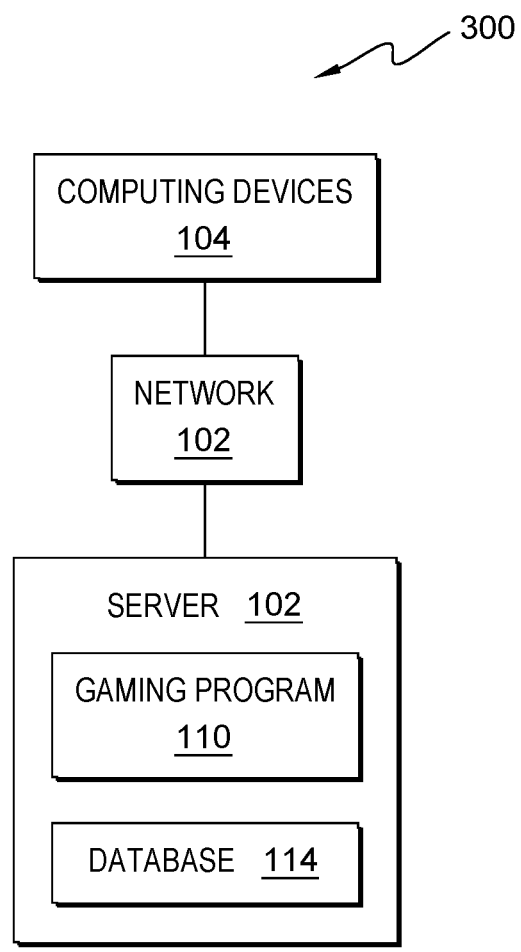
FIG. 3 depicts a block diagram depicting a computing environment according to an embodiment of the present invention.

FIG. 3 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, computing devices 104, and server 108. Computing environment 100 may include additional servers, computers, or other devices not shown.

Network 102 may be a local area network (LAN), a wide area network (WAN) such as the Internet, any combination thereof, or any combination of connections and protocols that can support communications between computing devices 104 and server 108 in accordance with embodiments of the invention. Network 102 may include wired, wireless, or fiber optic connections.

computing device 104 may be a management server, a web server, or any other electronic device or computing system capable of processing program instructions and receiving and sending data. In some embodiments, computing device 104 may be a laptop computer, tablet computer, netbook computer, personal computer (PC), a desktop computer, or any programmable electronic device capable of communicating with the other computing devices 104 and server 108 via network 102. In other embodiments, computing device 104 may represent a server computing system utilizing multiple computers as a server system, such as in a cloud computing environment. In another embodiment, computing device 104 represents a computing system utilizing clustered computers and components to act as a single pool of seamless resources. In some embodiments, computing device 104 contains the gaming program 110, and database 114. Computing device 104 may include components, as depicted and described in further detail with respect to FIG. 1.

Server 108 may be a management server, a web server, or any other electronic device or computing system capable of processing program instructions and receiving and sending data. In other embodiments server 108 may be a laptop computer, tablet computer, netbook computer, personal computer (PC), a desktop computer, or any programmable electronic device capable of communicating via network 102. In one embodiment, server 108 may be a server computing system utilizing multiple computers as a server system, such as in a cloud computing environment. In one embodiment, server 108 represents a computing system utilizing clustered computers and components to act as a single pool of seamless resources. In the depicted embodiment database 114 is located on server 108. Server 108 may include components, as depicted and described in further detail with respect to FIG. 1.

Gaming program 110 operates to provide the platform on which the games are played and the platform which the players interact through. In some embodiments, the gaming program 110 provides the player profiles, the platform for which transactions are completed through, and the communication protocols between the players. In the depicted embodiment, gaming program 110 utilizes network 102 to access the computing devices 104, and communicates with database 114. In one embodiment, gaming program 110 resides on computing device 104. In other embodiments, gaming program 110 may be located on another server or computing device, provided gaming program 110 has access to database 114 and computing device 104.

Database 114 may be a repository that may be written to and/or read by gaming program 110. In one embodiment, database 114 is a database management system (DBMS) used to allow the definition, creation, querying, update, and administration of a database(s). In the some embodiment, database 114 resides on computing devices 104. In other embodiments, database 114 resides on another server, or another computing device, provided that database 114 is accessible to gaming program 110.

Figure 4:
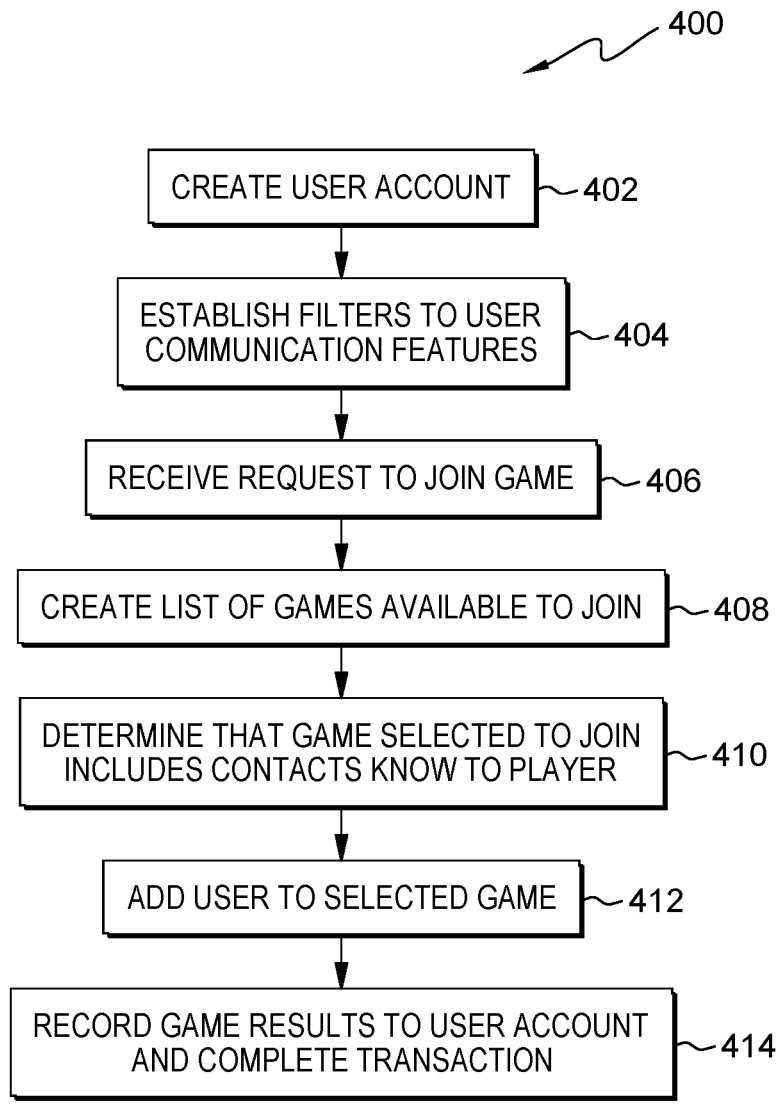
FIG. 4 depicts a flowchart of the operational steps taken by a program to manipulate the user experience based on the relationship with the other players within the computing environment of FIG. 1 according to an embodiment of the present invention.

FIG. 4 depicts a flowchart 400 depicting a method according to the present invention. The method(s) and associated process(es) are now discussed, over the course of the following paragraphs, with extensive reference to FIG. 4, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 6:
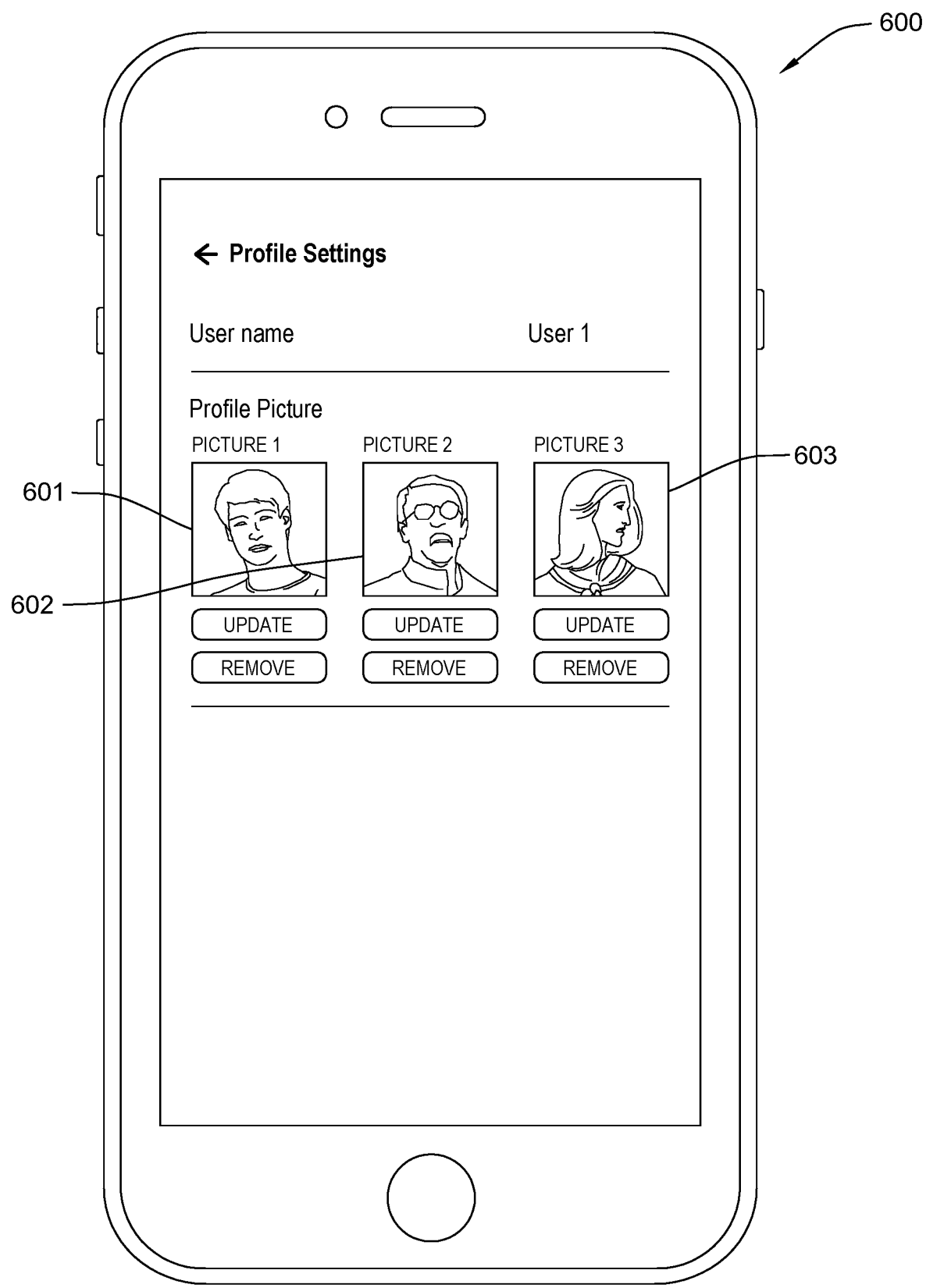
FIG. 6 depicts a user interface, according to an embodiment of the present invention.
Figure 10:
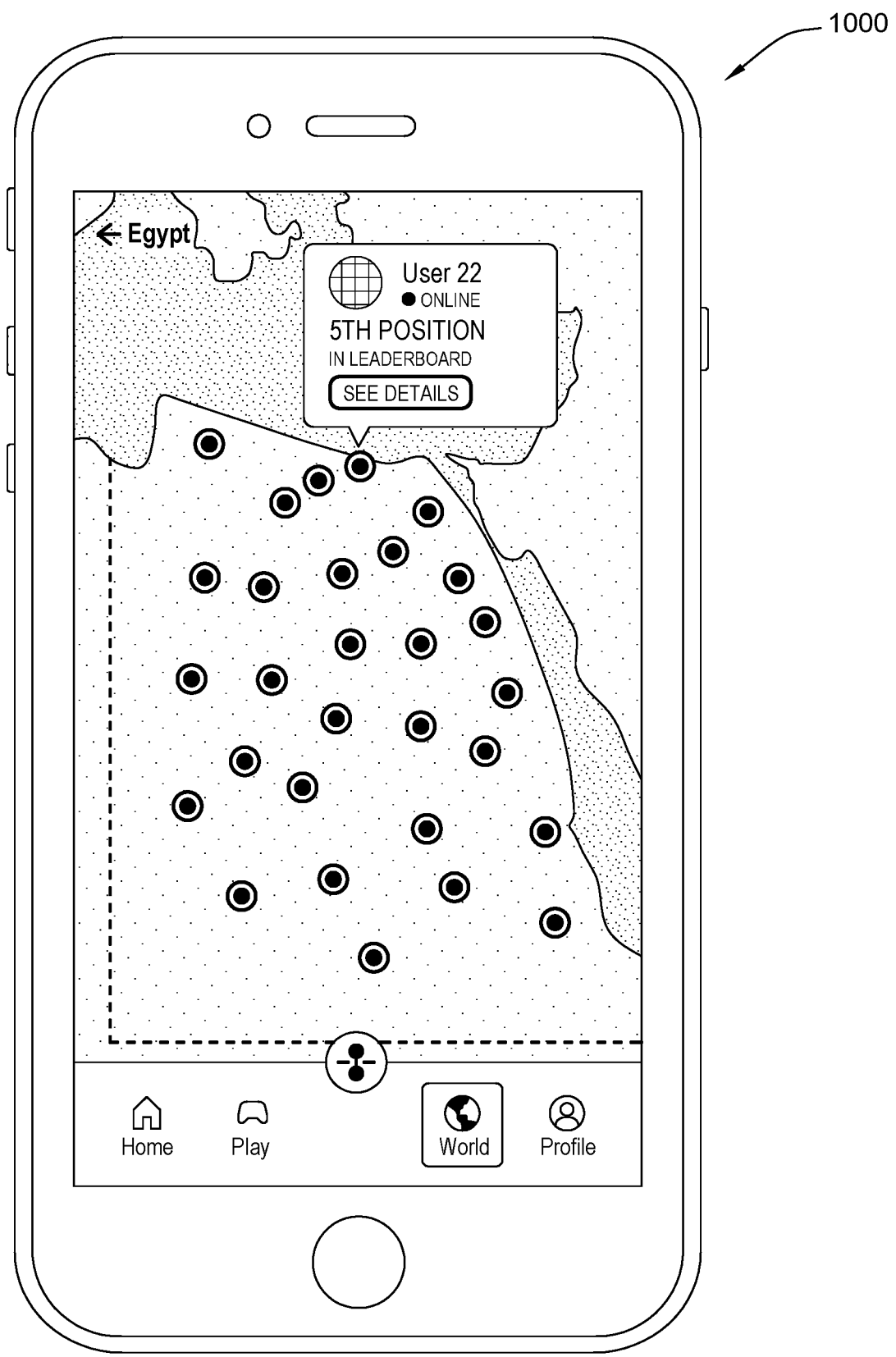
FIG. 10 depicts a user interface, according to an embodiment of the present invention.

In step 402, gaming program 110 creates the user profile. In the creation of the user profile the user provides various personal information related to the user, for example, address, phone number, bank profile, email address, and the like to allow the user to complete the profile creation. In some instances, the user is required to provide a picture of the user. In additional embodiments, the gaming program 110 requires access to the devices camera to capture a picture or a video of the user. This is used for both identification purposes and security purposes. Depicted in FIG. 6, a user interface 600 is shown, where a user profile is shown, where the user is able to upload different images to be used for their profile 601, 602, and 603. In some embodiments, profile picture 601 is the actual user, and 602 and 603 are modified version of the user profile picture or are deep fake versions of the user. The creation of the deep fake requires using facial recognition technology to modify the features of the user's face. The program has the ability to manipulate the user's face to make it distinguished from their real image, this may be through altering their facial features or completely replacing their face with that of another (e.g. deep fake). The user's facial cues and movements are captured by the camera and the program and are accurately shown in their video feed. The gaming program 110 may access the user's devices camera to capture the image or to use for real time video. Gaming program 110 is able to perform this process and create random profile picture or faces from the user's face via a camera or from the uploaded image. These images maybe associated with a group, for example "friends" or know players, unknown players, or everyone. In some embodiment, the user is able to select a standard or default fake (or deep fake) picture or persona to appear to players that the user does not want to know their identity. The user is able to customize their profile with different information, a bank profile, different filter settings, and search criteria for game type and player settings (e.g. unranked, geographical location, etc.). As shown in FIG. 10, a user interface 1000 an image of a map is shown, where all active players are shown by a dot, and by selecting that dot the user is able to see information about the player and invite the player to play a game if the player is active.

Figure 7:
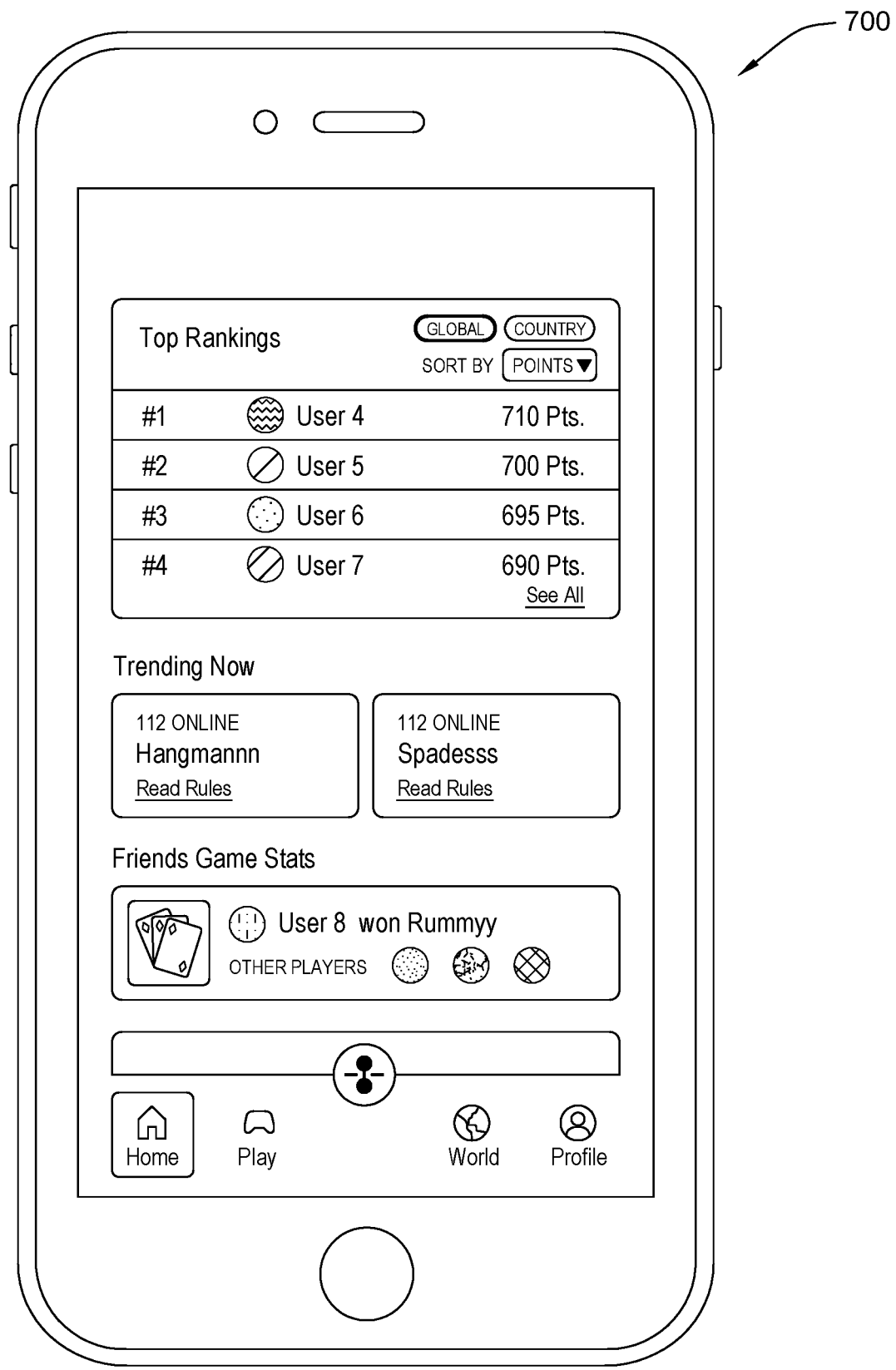
FIG. 7 depicts a user interface, according to an embodiment of the present invention.
Figure 8:
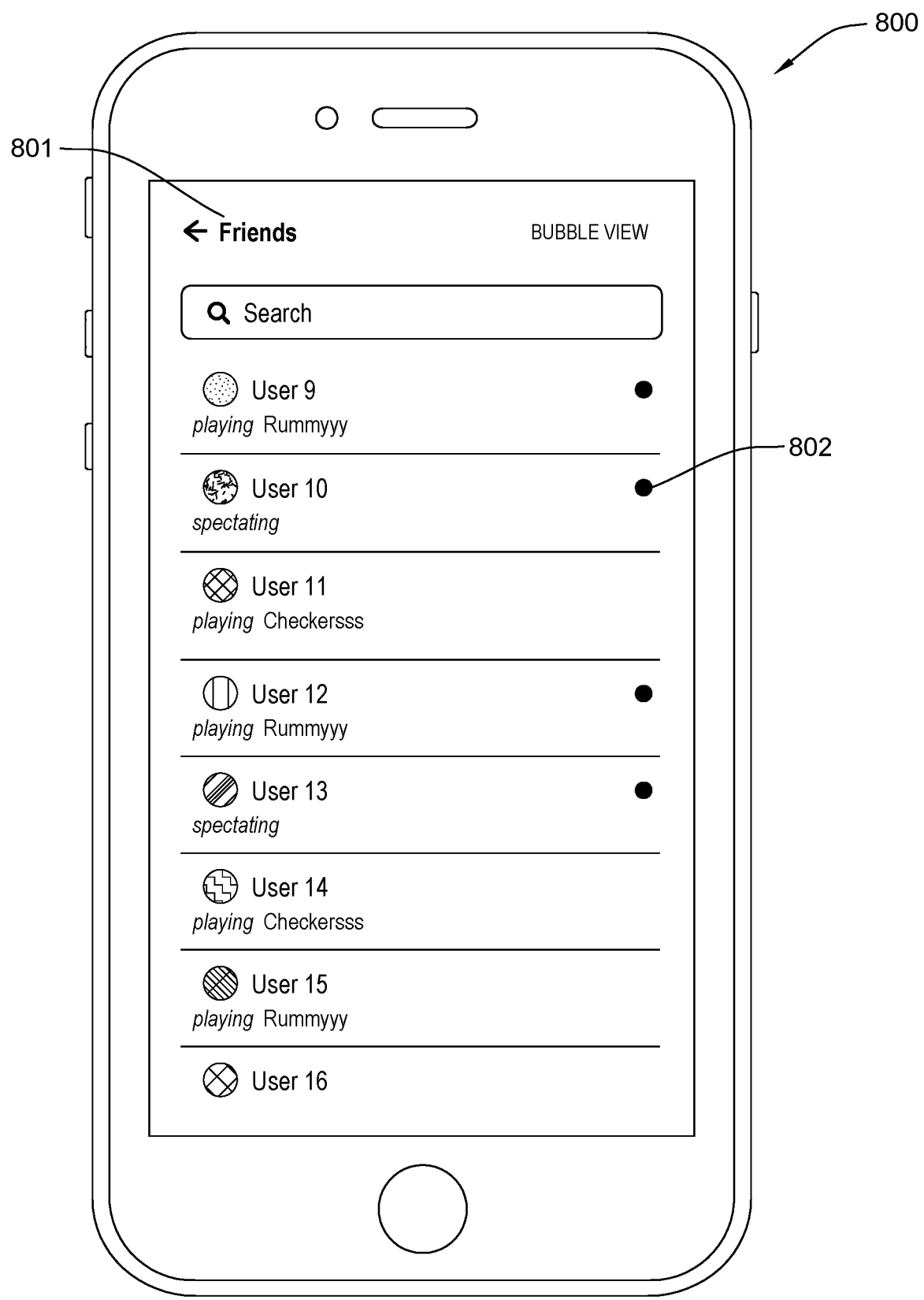
FIG. 8 depicts a user interface, according to an embodiment of the present invention.
Figure 9:
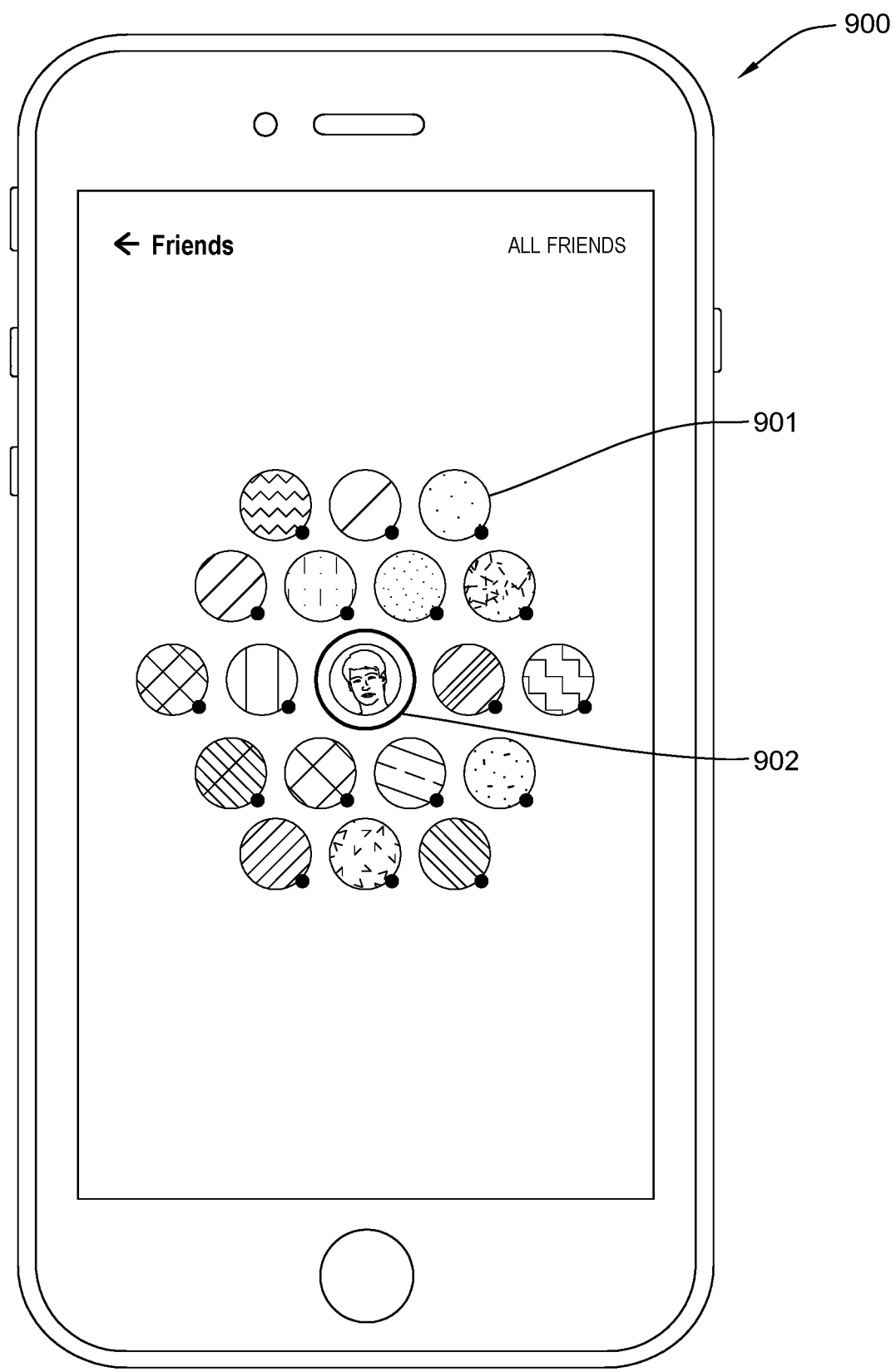
FIG. 9 depicts a user interface, according to an embodiment of the present invention.

In FIG. 7, a user interface 700 is shown depicted a home screen showing various pieces of information, which are set by the user profile. In the depicted embodiment, a top ranking of players is shown, trending games, a live feed of friends activities. There are also icons at the lower end of the screen showing the "home" screen, a play screen to find games to play, a world icon to show the location of various players around the world to connect with, and a profile icon to return to profile page. Depicted in FIG. 8, is a user interface 800 showing the user's friends 801 and their status 802, and what the friend is currently doing (e.g. spectating, playing, offline, etc. As shown in FIG. 9, a user interface 900 showing the user 902 and his friends 901 in bubbles, wherein active friends are shown in a colored view or with an indicator and inactive friends are shown in black and white.

In step 404, gaming program 110 applies the filters to the user's communication methods to maintain security and safety of the user. The user profile has various alterations applied to the user communication methods to maintain the security of the user. Through the captured image of the user, the gaming program 110 is able to map the user's face to create a set of data points to apply a skin or modification to the user's face to alter their appearance enough to make them unrecognizable. The user's image which was captured is also modified to be unrecognizable of the original person. In some embodiments, this may be blurring the image beyond recognition. In some embodiments, a deep fake style modification is made to the user's face to change his characteristics. The gaming program 110 has access to the computing device's 104 microphone and is able to apply a voice alteration process to the audio to distort the user's voice.

Figure 11:
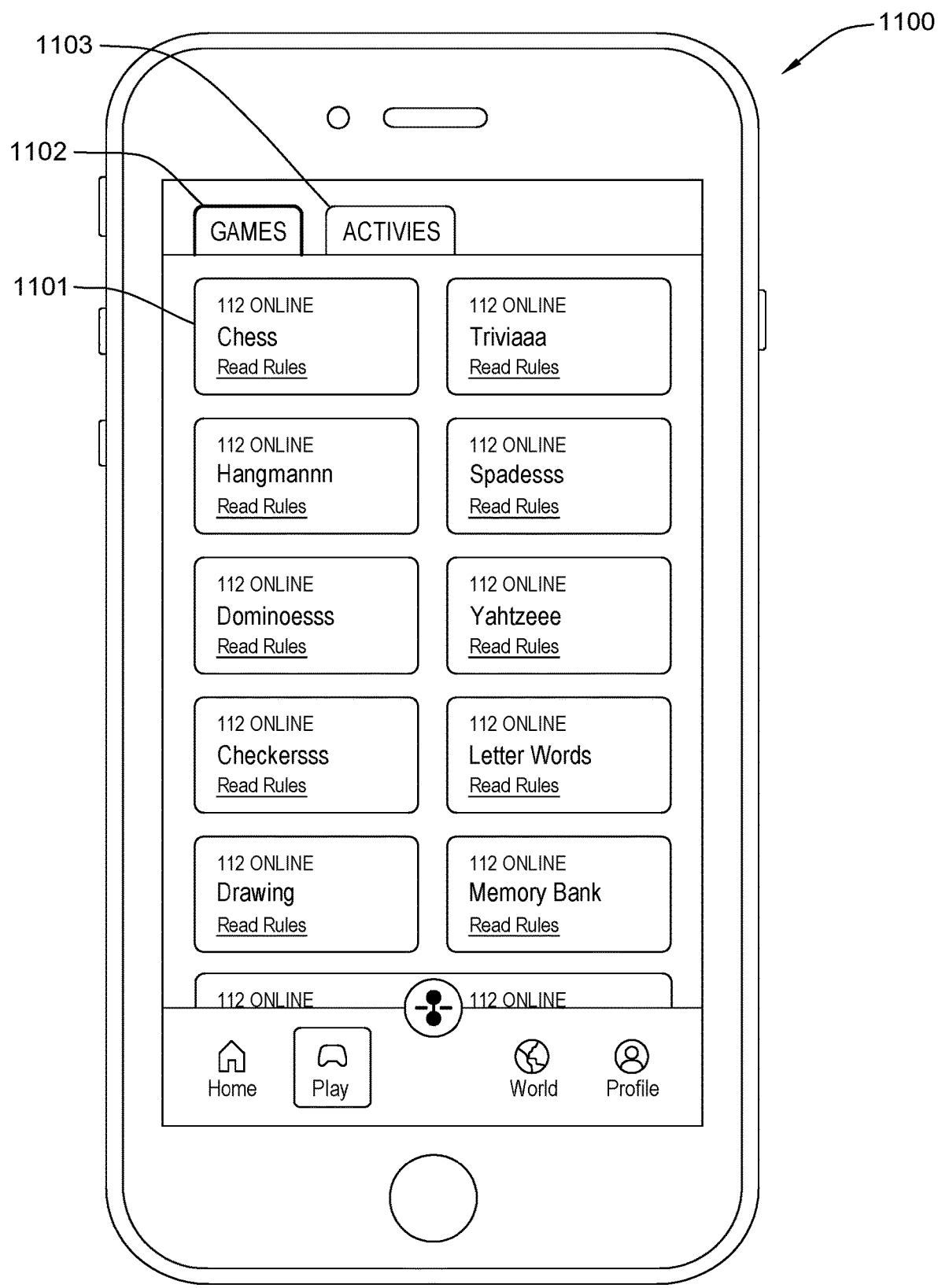
FIG. 11 depicts a user interface, according to an embodiment of the present invention.

In step 406, gaming program 110 receives a request from the user to join a game. For example, the games may be, but not limited to, Chess, Trivia, Hangman, Spades', Dominoes, Yahtzee, Checkers, Letter Words (Scrabble), Drawing (Pictionary), Memory Bank, Link 4 (Connect 4), Word Seeker, Differentiation, Pattern (Simon), Shoot for the stars, Rummy, or it can be an activity, such as but not limited to Never have I ever, Tell a secret, Truth or dare, Dream life, Twenty questions, Make Me Laugh, Two Truths and a Lie, Would You Rather, Fact or Fiction, The Alphabet Game, Ask Me Anything, Five Daily Facts, Famous Name, The Accent Challenge, Play Kiss, Marry, Kill, Rock-Paper-Scissors, Copycat, Stare Down Challenge, and the like. Based on the game, the program 110 may require audio, video, or an image of the user to play the game. These can be games of skill or games of chance. Each game has a requirement for forms of communication between the players. For example some games may require a camera, some games may only require a microphone. As shown in FIG. 11, a user interface 1100 of the list of active games 1102 and activities 1103 and players currently waiting to play each of the games 1101. These players may be in a lobby or waiting for a lobby to be formed. In some embodiments, the user may create a game, and wherein players waiting to join a game are selected, to be entered into the game.

In step 408, gaming program 110 creates a list of all games which are available to be played by the user. This may be adjusted based on the user's preference of the game type, the number of players, the players ranking, the stakes at play for the game, the number of players needed for the game to start, the geographical location of the players and the like. In some instances, if the user wishes to play for currency, the players need to be approved to play based on their location and their user profile setup.

Figure 12:
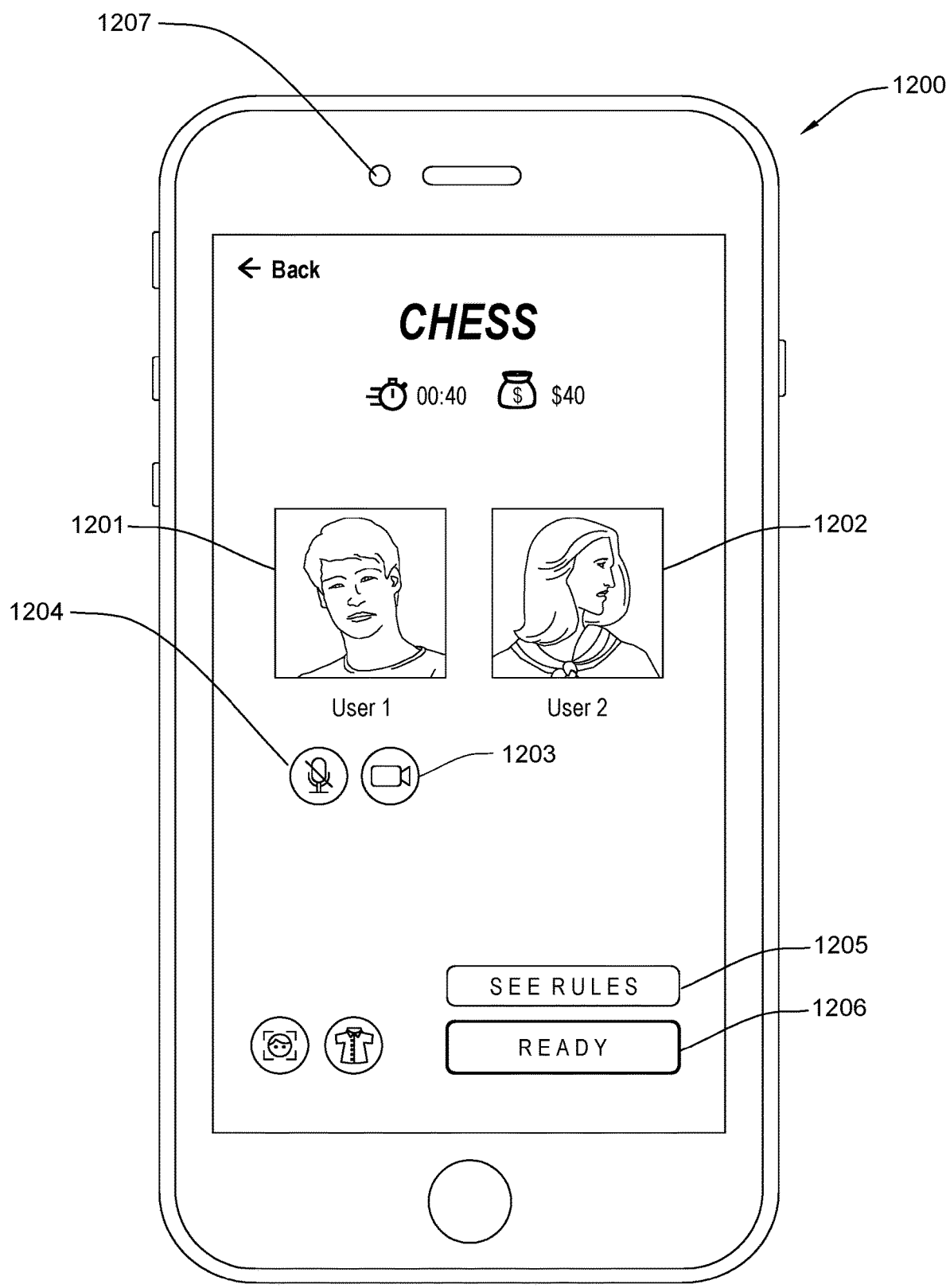
FIG. 12 depicts a user interface, according to an embodiment of the present invention.

In step 410, gaming program 110, determines if at least one of the players within the game is a "friend" or known party to the user. Given that the user is "friends" or connected with at least one of the other players, the filters are not needed to be applied to the user regarding the known players. The filters are still applied for all players which are unknown to the user, unless the user determines they want to remove the filters manually. This removes the distortions and modifications to the video and audio only if the other player is a "friend" or is manually selected by the user. Once the user selected a game, the user is entered into a lobby as shown in FIG. 12. The interface 1200 is shown from the user's perspective given that the real image 1201 of the user is shown and his opponent 1202 is shown. This may be a manipulated image of his opponent 1202 given the relationship of the two parties and the user's selection. Icons 1204 and 1203 allow the user to turn on and off his microphone and camera respectively. In some embodiments, the user may be able to adjust his image 1201 through the use of icon 1203 to change the image (use his real image, a different deep fake or image), change who can see his real image or fake image, or the like. By pressing icon 1203 a new window may open allowing the user to select from a number of different options which are available to them to edit or manipulate their image or likeness. The icon 1204 may also the user to adjust the voice so that it is their real voice or various different altered voices. The pressing of this icon may also open a window to show a variety of options for the modifications to the user's voice. Icon 1203 allows the user to apply a variety of edits to his image and allows the user to activate his camera to either apply a new manipulation to his image or to take a new photo for his image. Icon 1205 provides the rules for the game and icon 1206 allows the user to start the game or indicate they are ready to start the game. In the depicted embodiment, the pictures of the user and the opponent are both unfiltered and the participants are able to communicate with one another through the approved means of communication. In the depicted embodiment, the device has a camera 1207 to capture the user's image or to show the live video feed of the user.

In step 412, the gaming program 110 adds the user to the game and processes the game to start. At the beginning of the game, the players may choose what they wish to wager on the game, the game rules, an overview of the players, and a chat window to allow the players to communicate while the game is getting started. In step 414, the gaming program 110 has completed the game and recorded the results, who won, who lost, and the wagers of the players. If a currency wager was made, the program 110 transfers the funds from the loser to the winner. In some embodiments, the program 110 uses third party software to complete the transaction between the player's bank profiles.

Figure 5:
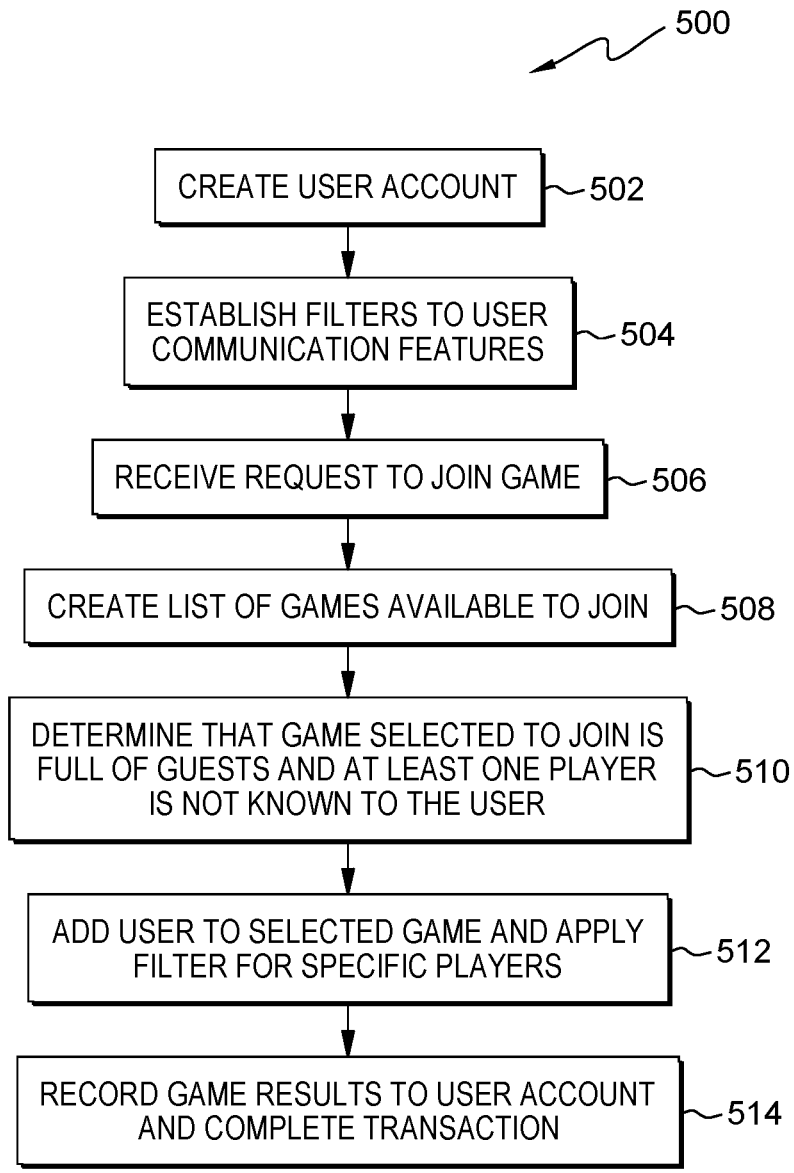
FIG. 5 depicts a flowchart of the operational steps taken by a program to manipulate the user experience based on the relationship with the other players within the computing environment of FIG. 1 according to an embodiment of the present invention.

FIG. 5 depicts a flowchart 500 depicting a method according to the present invention. The method(s) and associated process(es) are now discussed, over the course of the following paragraphs, with extensive reference to FIG. 5, in accordance with one embodiment of the present invention. Steps 502-508 are similar to the process of FIG. 4.

Figure 13:
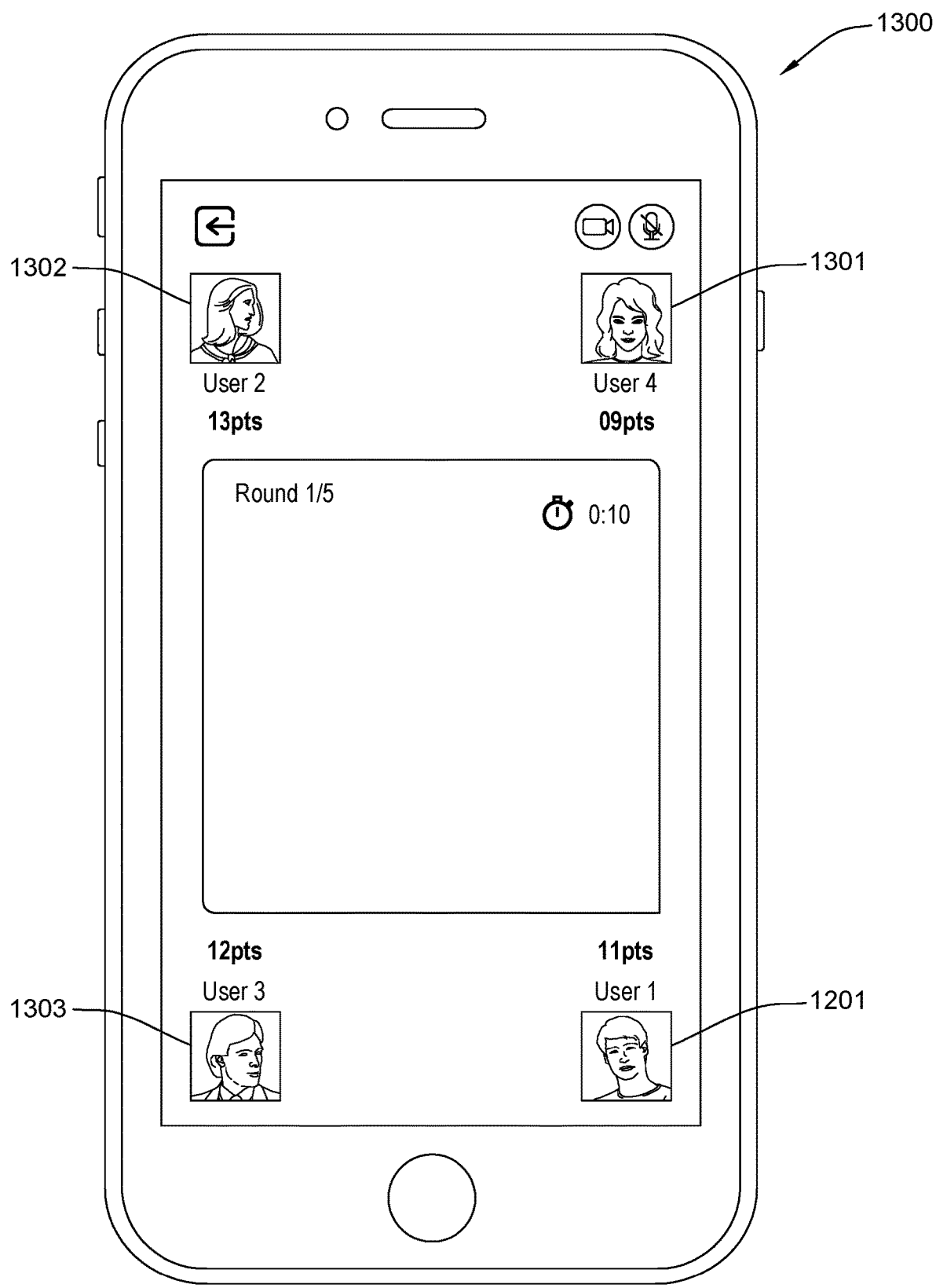
FIG. 13 depicts a user interface, according to an embodiment of the present invention.
Figure 14:
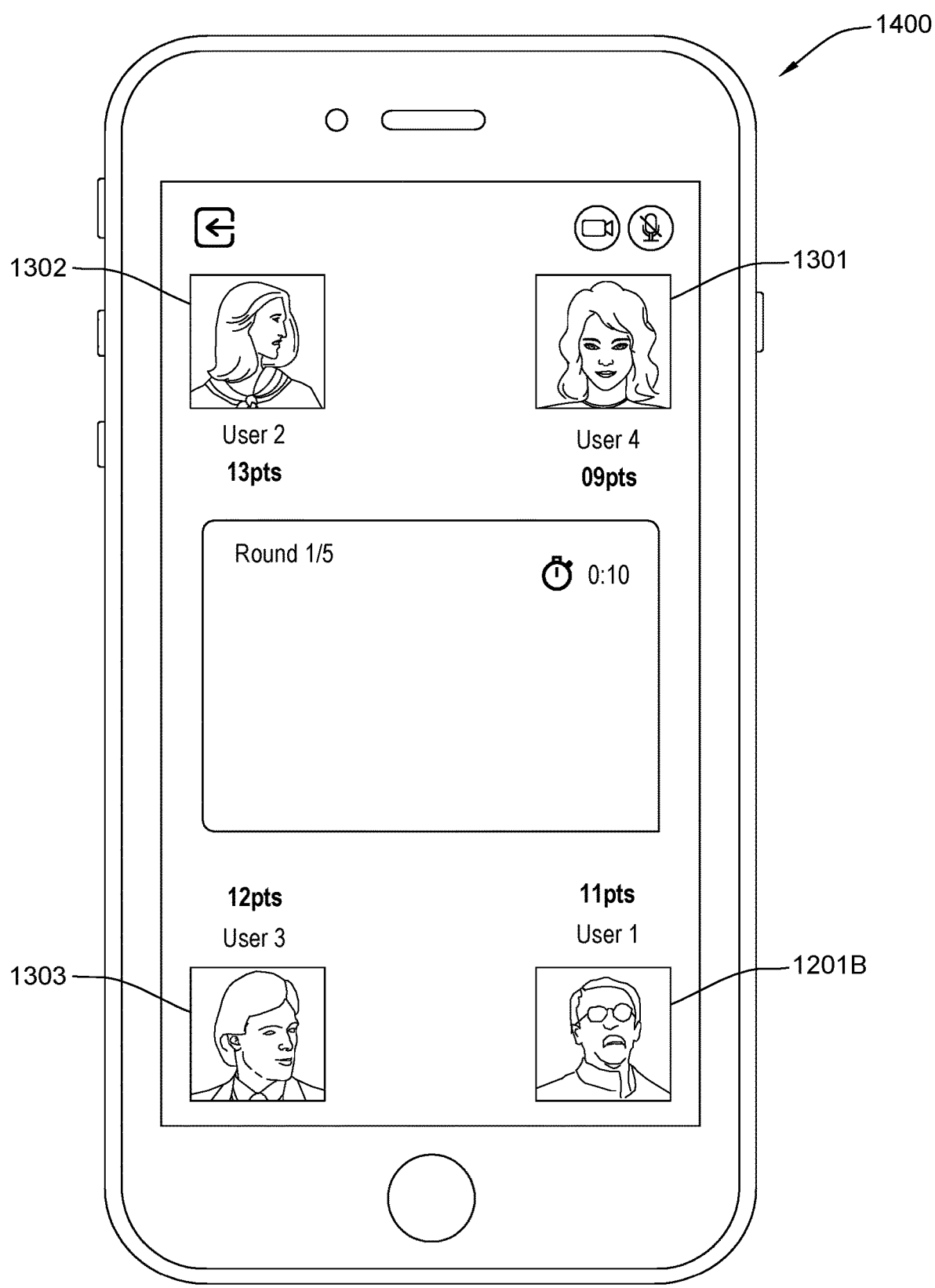
FIG. 14 depicts a user interface, according to an embodiment of the present invention.

In step 510, the gaming program 110 determines the status of the other players in the game. In step 512, the gaming program 110 applies the filter to the user's image or voice to hid their identity. In some games there are more than two players and if at least one of the users is not a "friend" the program applies the filter to the communication form which is common among all the players, while also only applying the filters to the communication methods between the non-friend players and keeping the communication methods which are between the friend and the user without the filter. Thus, each of the other players in the game may experience a different version of the user. This will keep the communication directly between the user and the friend unfiltered and all other communication forms filtered. For instance, a friend may see the user's video feed or picture unfiltered un their computing device, while the other non-friend players will see the user's video feed or picture filtered. In some instances where the microphone is shared among all the players, everyone hears the audio with the filter. In other embodiments, each player will hear the user in either a filtered or unfiltered format based on their relationship to the user. In some instances, the gaming program 110 is able to remove all filters for the friend of the user on their computing device. As depicted in FIG. 13, a user interface 1300 from the user's perspective is shown, where there are three opponents 1301, 1302, and 1303. The opponents 1301, 1302, and 1303 are shown as they have chosen to be shown as, this may be their real face or a manipulated face. The user 1201 is unable to tell if the opponents are showing their real face or a fake image. The user is also able to see his image or feed 1201 in an unmanipulated version. In some embodiments, he is able to alter this to show the manipulated version of his image or video feed. In FIG. 14, a user interface 1400 is shown from an opponent's perspective where the players 1302, 1301, and 1303 are shown and the user 1201B is shown in a manipulated format. This keeps the user's identity secret and still allows the other opponents to see the facial expressions of the user, as these may be important to the game.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer-implemented method comprising:
    identifying, by one or more processors, an image of a user;
    generating, by the one or more processors, an altered image of the user;
    receiving, by the one or more processors, confirmation that the user has joined a game, and identifying the relationship between the user and the other participants in the game;
    altering, by the one or more processors, the other participants user interface where the user is shown with the altered image based on a known relationship with the user; and
    concealing, by the one or more processors, the user's identity from the participants which do not have a relationship with the user;
    wherein the type of game joined by the user is identified to determine if an image or a live feed of the user is required based on a known set of requirements for the game, and manipulating, by one or more processors, the visual or verbal features of the user which are requirements for the game.

2. The computer-implemented method of claim 1, further comprising, altering, by the one or more processors, the users voice.

3. The computer-implemented method of claim 1, further comprising, analyzing, by the one or more processors, the participants in the game with a list of participants which are known to the user.

4. The computer-implemented method of claim 1, further comprising, creating, by the one or more processors, an alternative profile image through artificial intelligence, wherein a set of facial features of the user are manipulated to a predetermined value.

5. The computer-implemented method of claim 1, further comprising, capturing, by the one or more processors, the facial expressions of the user, wherein the facial expressions of the user are manipulated to the altered profile image, whereby the participants are able to see the facial expressions of the user in real time.

6. The computer-implemented method of claim 1, wherein more than one altered images of the user are generated.

7. A computer program product comprising
    a computer non-transitory readable storage medium having program instructions embodied therewith, the program instructions executable by a computing device to cause the computing device to:
    receiving a visual representation of a user and identifying a set of facial characteristics of the user;
    manipulating the set of facial characteristics of the user to hid their identity by modifying the facial characteristics of the user, wherein the manipulating of the set of facial characteristics of the user are to a predetermined percentage of the user's original set of facial characteristics;

receiving confirmation that the user has joined a game wherein at least one of the other participants are not known to the user;

providing the manipulated visual representation of the user to the other participants who are not known to the user, wherein the other participants who are not known to the user are able to see facial expressions performed by the user which are shown through the manipulated visual representation of the user; and wherein the type of game joined by the user is identified to determine if an image or a live feed of the user is required based on a known set of requirements for the game.

8. The computer program product of claim 7, further comprising, manipulating the user's voice.

9. The computer program product of claim 7, creating more than one manipulation of the set of facial characteristics of the user.

10. A system comprising:

a CPU, a computer readable memory and a computer non-transitory readable storage medium associated with a computing device;

connecting to a image capturing feature of a user's computing device wherein an image of the user's face is collected manipulating the user's face so that the user's face is unrecognized in the manipulated version;

receiving conformation that the user has connected to a game and analyzing the other participants in the game to determine if the other participants are known to the user;

manipulating a feed of the user to the other unknown participants, wherein the feed is manipulated to show the manipulated version of the user's face;

determining the game requirements related to the visual and verbal requirements of the game; and providing real time updates to the feed based on the changes in the user's mannerisms.

11. The system of claim 10, further comprising manipulating the user's voice, so that the user's voice is unrecognizable.

12. The system of claim 11, further comprising manipulating the visual and verbal requirements for the specific game.

\* \* \* \* \*